(12) United States Patent
Matsumoto et al.

(10) Patent No.: US 7,791,753 B2
(45) Date of Patent: Sep. 7, 2010

(54) CLIENT COMPUTER, PRINTER DRIVER GENERATION METHOD, AND PRINTER DRIVER RETRIEVAL METHOD

(75) Inventors: Akira Matsumoto, Nagano-ken (JP); Toshihiro Shima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1199 days.

(21) Appl. No.: 11/389,176

(22) Filed: Mar. 27, 2006

(65) Prior Publication Data

US 2006/0256373 A1    Nov. 16, 2006

(30) Foreign Application Priority Data

Mar. 28, 2005    (JP) .............................. 2005-092934

(51) Int. Cl.
G06F 3/12    (2006.01)
(52) U.S. Cl. .................................... 358/1.15; 358/1.13
(58) Field of Classification Search ................. 358/1.15
See application file for complete search history.

(56) References Cited

U.S. PATENT DOCUMENTS

| | | | | |
|---|---|---|---|---|
| 5,625,757 | A * | 4/1997 | Kageyama et al. | 358/1.14 |
| 7,102,778 | B2 * | 9/2006 | Parry | 358/1.15 |
| 7,102,783 | B2 * | 9/2006 | Morooka et al. | 358/1.15 |
| 7,180,623 | B2 * | 2/2007 | Kato | 358/1.15 |
| 7,312,886 | B2 * | 12/2007 | Gomi | 358/1.15 |
| 7,548,331 | B2 * | 6/2009 | Ferlitsch | 358/1.15 |
| 2001/0048833 | A1 * | 12/2001 | Katsuda et al. | 400/76 |
| 2002/0030851 | A1 * | 3/2002 | Wanda | 358/1.15 |
| 2002/0089687 | A1 * | 7/2002 | Ferlitsch et al. | 358/1.15 |
| 2002/0113989 | A1 * | 8/2002 | Ferlitsch et al. | 358/1.15 |
| 2003/0007177 | A1 * | 1/2003 | Ferlitsch | 358/1.15 |
| 2003/0090697 | A1 * | 5/2003 | Lester et al. | 358/1.14 |
| 2003/0184787 | A1 * | 10/2003 | Kuroda et al. | 358/1.13 |

(Continued)

FOREIGN PATENT DOCUMENTS

EP    1424627 A2 *    6/2004

(Continued)

*Primary Examiner*—King Y Poon
*Assistant Examiner*—Kenneth Kwan
(74) *Attorney, Agent, or Firm*—Sughrue Mion, PLLC

(57) ABSTRACT

A client computer of the invention utilizes a printer driver for a distribution source printer to send a print job to the distribution source printer. The distribution source printer distributes each print job sent with setting of a preset second port number to multiple distribution destination printers. The client computer includes: a storage unit that stores a first printer driver with property information including specification of a port number, which is specified and used for transmission of each print job and is currently set to a preset first port number, as one printer driver for the distribution source printer; and a printer driver generation module that, in response to an externally given instruction, duplicates the property information of the first printer driver read from the storage unit and changes the port number included in the duplicated property information of the first printer driver to the preset second port number, which is different from the preset first port number, so as to generate a second printer driver as another printer driver for the distribution source printer. This arrangement enables the first printer driver and the second printer driver having the different settings of the port number included in the property information to be readily provided in the client computer as multiple different printer drivers for the distribution source printer.

9 Claims, 5 Drawing Sheets

U.S. PATENT DOCUMENTS

| | | | |
|---|---|---|---|
| 2003/0225821 A1* | 12/2003 | Wanda | 709/201 |
| 2004/0025156 A1* | 2/2004 | Rochford et al. | 717/174 |
| 2004/0160631 A1* | 8/2004 | Schlonski et al. | 358/1.15 |
| 2004/0190042 A1* | 9/2004 | Ferlitsch et al. | 358/1.15 |
| 2004/0193748 A1* | 9/2004 | Sugimoto | 710/15 |
| 2004/0201939 A1* | 10/2004 | Shipton et al. | 361/104 |
| 2005/0007612 A1* | 1/2005 | Bourret | 358/1.11 |
| 2005/0036166 A1* | 2/2005 | Williams et al. | 358/1.15 |
| 2005/0134909 A1* | 6/2005 | Shima et al. | 358/1.15 |
| 2005/0237557 A1* | 10/2005 | Ferlitsch | 358/1.13 |
| 2005/0278521 A1* | 12/2005 | Hirai | 713/1 |
| 2006/0017958 A1* | 1/2006 | Jackson et al. | 358/1.14 |
| 2006/0072140 A1* | 4/2006 | Mitani | 358/1.13 |
| 2006/0244990 A1* | 11/2006 | Eng et al. | 358/1.15 |
| 2008/0218796 A1* | 9/2008 | Wanda | 358/1.15 |

FOREIGN PATENT DOCUMENTS

| | | |
|---|---|---|
| JP | 2002-215368 A | 8/2002 |

\* cited by examiner

CLIENT COMPUTER, PRINTER DRIVER GENERATION METHOD, AND PRINTER DRIVER RETRIEVAL METHOD

BACKGROUND OF THE INVENTION

1. Field of the Invention

The present invention relates to a distributed printing system that distributes a print job to multiple printers on a network.

2. Description of the Related Art

In currently popular printing systems, each user is allowed to selectively use multiple printing devices connected to an identical network. A distributed printing technique applicable to such printing systems has been proposed to distribute a print job to plural printing devices for simultaneous distributed printing and thereby complete execution of the whole print job within a short time (see, for example, Japanese Patent Laid-Open Gazette No. 2002-215368).

A distributed printing system includes multiple printers, a client computer that creates print jobs, and a distribution source printer that has distributed printing control functions and is different from the multiple printers. The printers, the client computer, and the distribution source printer are interconnected via a network. The distribution source printer receives a print job sent from the client computer, selects one or plural printers as distribution destinations among the multiple printers, and distributes the print job to the selected distribution destination printers.

In this distributed printing system, the distribution source printer naturally has general printing functions to print a received print job (standard printing) by the distribution source printer itself without distributing the print job, like the other printers. The distribution source printer is thus required to identify each print job received from the client computer as a print job for distributed printing or a print job for standard printing. In one applicable technique to the distributed printing system, the distribution source printer identifies each received print job as a print job for distributed printing or a print job for standard printing, based on a receiver port number (hereafter may be simply referred to as 'port number') specified in transmission of the print job.

In the distributed printing system of this technique that utilizes the port number for identification of a print job, the client computer is required to specify a port number corresponding to a print mode, for example, a standard print mode or a distributed print mode, before transmission of each print job.

A functional module according to a printer driver program installed in the client computer refers to setting information or properties for the printer driver program and specifies a corresponding port number. Multiple different printer drivers with properties including port numbers corresponding to individual print modes should accordingly be provided in the client computer.

There is a similar requirement in another applicable technique to the distributed printing system, where the distribution source printer identifies each received print job as a print job for distributed printing or a print job for standard printing, based on a printing protocol adopted for transmission of the print job.

SUMMARY OF THE INVENTION

The object of the invention is thus to readily provide multiple different printer drivers corresponding to individual print modes (standard print mode and distributed print mode) in a client computer.

In order to attain at least part of the above and the other related objects, the present invention is directed to a first client computer that utilizes a printer driver for a distribution source printer to send a print job to the distribution source printer, where the distribution source printer distributes each print job sent with setting of a preset second port number to multiple distribution destination printers. The first client computer includes: a storage unit that stores a first printer driver with property information including specification of a port number, which is specified and used for transmission of each print job and is currently set to a preset first port number, as one printer driver for the distribution source printer; and a printer driver generation module that, in response to an externally given instruction, duplicates the property information of the first printer driver read from the storage unit and changes the port number included in the duplicated property information of the first printer driver to the preset second port number, which is different from the preset first port number, so as to generate a second printer driver as another printer driver for the distribution source printer.

In the first client computer of the invention, the printer driver generation module generates the second printer driver having the preset second port number set to the port number included in the property information, as another printer driver for the distribution source printer. This arrangement enables the first printer driver and the second printer driver having the different settings of the port number included in the property information to be readily provided in the client computer as multiple different printer drivers for the distribution source printer.

The client computer selects either of the first printer driver and the second printer driver as the printer driver used for transmission of a print job and accordingly sends the print job with setting of either the preset first port number or the preset second port number corresponding to the selected printer driver to the distribution source printer.

The distribution source printer has general printing functions to print a print job received from the client computer by the distribution source printer itself without distributing the print job, as well as the distribution functions to distribute a print job received from the client computer to multiple distribution destination printers. For example, the distribution source printer may be designed to distribute a print job with setting of the preset second port number to the multiple distribution destination printers and to print a print job with setting of the preset first port number, which is different from the preset first port number. In this case, the client computer selects the first printer driver as the printer driver used for transmission of a print job to cause the distribution source printer to print the print job, while selecting the second printer driver to cause the distribution source printer to distribute the print job to the multiple distribution destination printers.

The present invention is also directed to a second client computer that utilizes a printer driver for a distribution source printer to send a print job to the distribution source printer, where the distribution source printer distributes each print job sent according to a preset second printing protocol to multiple distribution destination printers. The second client computer includes: a storage unit that stores a first printer driver with property information including specification of a printing protocol, which is specified and used for transmission of each print job and is currently set to a preset first printing protocol, as one printer driver for the distribution source printer; and a printer driver generation module that, in response to an externally given instruction, duplicates the property information of the first printer driver read from the storage unit and changes the printing protocol specified in the duplicated property information of the first printer driver to the preset second printing protocol, which is different from the preset first printing protocol, so as to generate a second printer driver as another printer driver for the distribution source printer.

In the second client computer of the invention, the printer driver generation module generates the second printer driver having the preset second printing protocol specified in the property information, as another printer driver for the distribution source printer. This arrangement enables the first printer driver and the second printer driver having the different printing protocols specified in the property information to be readily provided in the client computer as multiple different printer drivers for the distribution source printer.

The client computer selects either of the first printer driver and the second printer driver as the printer driver used for transmission of a print job and accordingly sends the print job according to either the preset first printing protocol or the preset second printing protocol corresponding to the selected printer driver to the distribution source printer.

The distribution source printer has general printing functions to print a print job received from the client computer by the distribution source printer itself without distributing the print job, as well as the distribution functions to distribute a print job received from the client computer to multiple distribution destination printers. For example, the distribution source printer may be designed to distribute a print job sent according to the preset second printing protocol to the multiple distribution destination printers and to print a print job sent according to the preset first printing protocol, which is different from the preset first printing protocol. In this case, the client computer selects the first printer driver as the printer driver used for transmission of a print job to cause the distribution source printer to print the print job, while selecting the second printer driver to cause the distribution source printer to distribute the print job to the multiple distribution destination printers.

In one preferable embodiment of the first client computer, the printer driver generation module generates the second printer driver for the distribution source printer in response to the externally given instruction by changing the port number included in the duplicated property information of the first printer driver from the preset first port number to the preset second port number and simultaneously disabling inquiry setting information, which is included in the duplicated property information and is enabled and disabled to allow the client computer to make an inquiry and to make no inquiry about an operating status of the distribution source printer.

Similarly in one preferable embodiment of the second client computer, the printer driver generation module generates the second printer driver for the distribution source printer in response to the externally given instruction by changing the printing protocol included in the duplicated property information of the first printer driver from the preset first printing protocol to the preset second printing protocol and simultaneously disabling inquiry setting information, which is included in the duplicated property information and is enabled and disabled to allow the client computer to make an inquiry and to make no inquiry about an operating status of the distribution source printer.

In either of the first client computer and the second client computer of this preferable embodiment, the first printer driver selected to cause the distribution source printer to print a print job makes an inquiry about the operating status of the distribution source printer. If the distribution source printer is in an unprintable status due to paper jam, out-of-toner, or any other trouble, the client computer does not send the print job to the distribution source printer. The second printer driver selected to cause the distribution source printer to distribute a print job to multiple distribution destination printers makes no inquiry about the operating status of the distribution source printer. In the case where the distribution source printer is in the unprintable status but has the capability of distributing a received print job, this arrangement enables transmission of a print job to the distribution source printer to attain distributed printing of the print job by the multiple distribution destination printers.

The present invention is further directed to a third client computer that utilizes a printer driver for one of multiple distribution source printers to send a print job to the distribution source printer, where each of the multiple distribution source printers distributes each print job sent with setting of a preset second port number to multiple distribution destination printers.

The third client computer includes: a storage unit that stores multiple first printer drivers as respective printer drivers for the multiple distribution source printers, where each first printer driver for one of the multiple distribution source printers has property information including identification information for identifying the distribution source printer and specification of a port number, which is specified and used for transmission of each print job and is currently set to a preset first port number; a printer driver generation module that, in response to an externally given instruction, specifies a first printer driver for a selected distribution source printer among the multiple first printer drivers for the multiple distribution source printers, duplicates the property information of the specified first printer driver read from the storage unit, changes the port number included in the duplicated property information of the specified first printer driver to the preset second port number, which is different from the preset first port number, to generate a second printer driver as another printer driver for the selected distribution source printer, and stores the generated second printer driver into the storage unit; and a retrieval module that retrieves any first printer driver without a corresponding second printer driver as a derivation no-generating driver, among plural printer drivers stored in the storage unit, The retrieval module refers to the port number included in the property information of each of the plural printer drivers stored in the storage unit to extract the multiple first printer drivers with specification of the preset first port number, determines whether the storage unit stores a second printer driver that corresponds to each of the extracted multiple first printer drivers and has property information including an identical piece of the identification information with the extracted first printer driver and the port number set to the preset second port number, and specifies the first printer driver with no storage of the corresponding second printer driver as the derivation no-generating driver.

In the third client computer of the invention, the storage unit stores second printer drivers generated by the printer driver generation module, in addition to the multiple first printer drivers for the multiple distribution source printers. The printer driver generation module generates the second printer driver by changing the port number included in the duplicated property information of the first printer driver to the preset second port number. The retrieval module extracts the multiple first printer drivers from the plural printer drivers stored in the storage unit, based on the settings of the port numbers included in the property information of the respective printer drivers.

The retrieval module determines whether the storage unit stores the second printer driver corresponding to each first printer driver and having the property information that includes an identical piece of the identification information with the extracted first printer driver and the port number set to the preset second port number. The first printer driver with no storage of the corresponding second printer is specified as the derivation no-generating driver. The third client computer of this arrangement thus readily specifies the first printer driver with no storage of the corresponding second printer driver having the property information that includes an identical piece of the identification information with the extracted first printer driver and the port number set to the preset second port number.

In one preferable structure of the invention, the third client computer further has a user interface to display a list of the derivation no-generating drivers specified by the retrieval module.

The display on the user interface informs the user of the list of first printer drivers specified as the derivation no-generating drivers.

The distribution source printer may be designed to distribute a print job with setting of the preset second port number to the multiple distribution destination printers and to print a print job with setting of the preset first port number, which is different from the preset first port number. In this case, the client computer selects the first printer driver as the printer driver used for transmission of a print job to cause the distribution source printer to print the print job, while selecting the second printer driver to cause the distribution source printer to distribute the print job to the multiple distribution destination printers.

In the third client computer of this preferable structure, the display on the user interface enables the user to readily check the storage unit for storage of the second printer driver with regard to the user's desired printer as a distribution source printer to receive a print job for distributed printing.

The technique of the invention is not restricted to the client computer having any of the above arrangements but may be actualized by a corresponding printer driver generation method or a corresponding printer driver retrieval method. There are diversity of other applications of the invention, for example, computer programs that are used to attain the client computer and the corresponding methods, recording media in which such computer programs are recorded, and data signals that include such computer programs and are embodied in carrier waves.

In the applications of the invention as the computer programs and the recording media in which the computer programs are recorded, the invention may be given as a whole program to control the client computer or as a partial program to exert only the characteristic functions of the invention. Available examples of the recording medium include ROM cartridges, punched cards, prints with barcodes or other codes printed thereon, internal storage devices (memories like RAMs and ROMs) and external storage devices of the computer, and diversity of other computer readable media.

DESCRIPTION OF THE PREFERRED EMBODIMENTS

Figure 1:
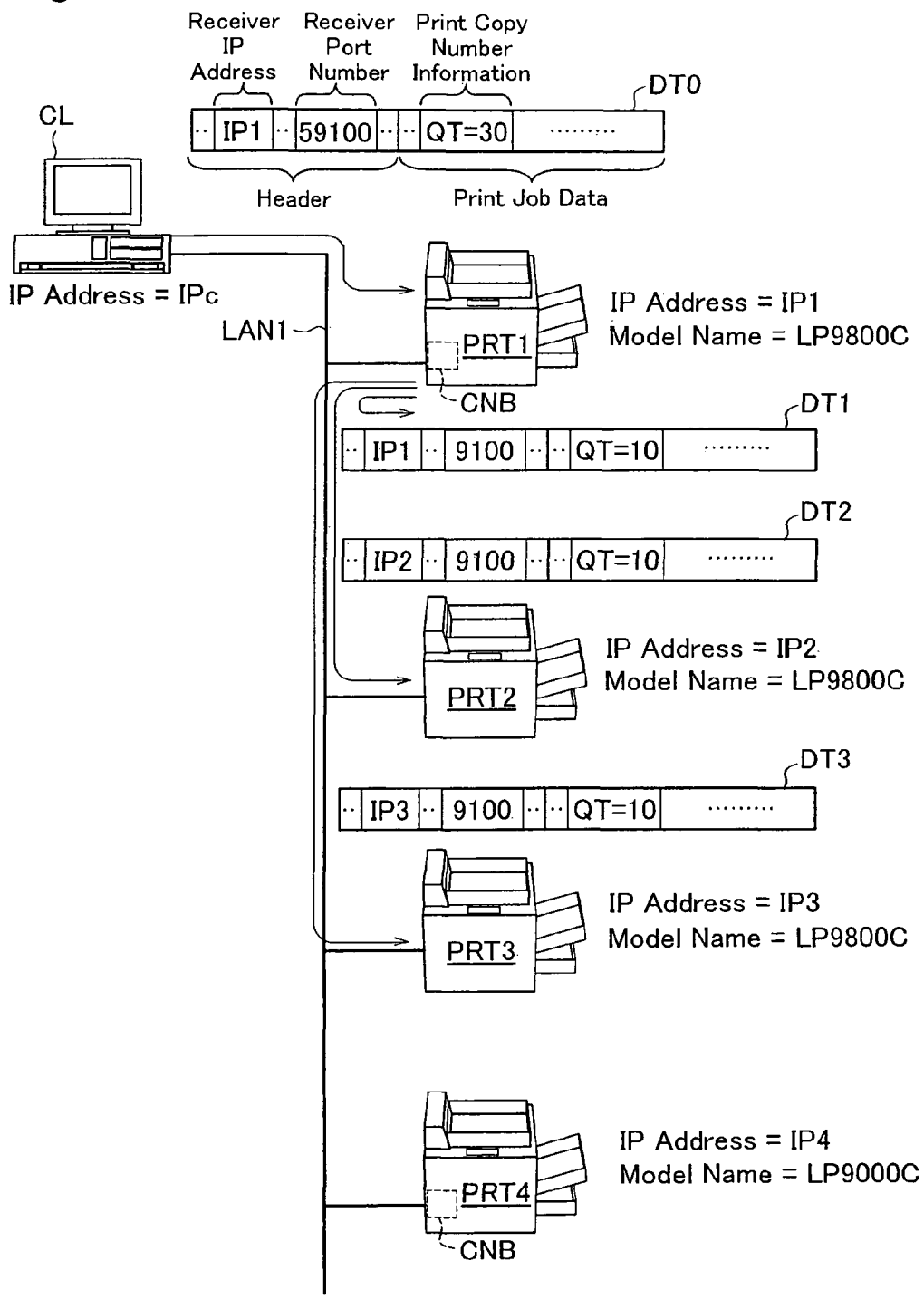
FIG. 1 schematically illustrates the configuration of a distributed printing system in one embodiment of the invention.

One mode of carrying out the invention is described below as a preferred embodiment in the following sequence:

A. Embodiment
   A1. General Configuration of Distributed Printing System and Outline of Distributed Printing Process
   A2. Structure of Client
   A3. Printer Driver Generation Process
   A4. Effects of Embodiment
B. Modifications A. Embodiment A1. General Configuration of Distributed Printing System and Outline of Distributed Printing Process FIG. 1 schematically illustrates the configuration of a distributed printing system in one embodiment of the invention. As illustrated in FIG. 1, the distributed printing system of the embodiment includes a client computer CL (hereafter simply referred to as client) and multiple printers PRT1 through PRT4, which are all connected to a local area network LAN1. A fixed IP address is allocated in advance to each of these devices included in the distributed printing system. For the convenience of explanation, it is assumed that an IP address 'IPc' is allocated to the client CL and IP addresses 'IP1' through 'IP4' to the printers PRT1 through PRT4.

Among the multiple printers PRT1 through PRT4, the printers PRT1 and PRT4 respectively have a custom network board CNB, which has a distributed printing control functions of specifying distribution destination printers as distribution destinations of a received print job and distributing the received print job to the specified distribution destination printers for execution of distributed printing. The other printers PRT2 and PRT3 respectively have a standard network board (not shown).

As shown in FIG. 1, the printers PRT1 through PRT3 have an identical model name 'LP9800C' and the printer PRT4 has a different model name 'LP9000C'.

The distributed printing system of the embodiment adopts two different distributed printing techniques, that is, 'copies-dividing distributed printing process' and 'copies-multiplying distributed printing process'. The client CL provides three different printer drivers for each printer model, that is, a standard print driver applied for standard printing, a copies-dividing distributed print driver applied for copies-dividing distributed printing, and a copies-multiplying distributed print driver applied for copies-multiplying distributed printing. One of these three printer drivers is selectively used corresponding to a selected print mode, that is, standard printing, copies-dividing distributed printing, or copies-multiplying distributed printing.

The details of the copies-dividing distributed printing process and the copies-multiplying distributed printing process are sequentially described below.

As one example of the copies-dividing distributed printing in FIG. 1, the client CL sends communication data DT0 including a print job to the printer PRT1.

The user manipulates the client CL to specify a copies-dividing distributed print driver for the printer PRT1 and give a print command for printing '30 copies' as a total number of required copies by copies-dividing distributed printing. A functional module of the client CL actualized by the specified printer driver program (hereafter may simply be referred to as 'printer driver') sends a print job including print copy number information as communication data DT0 to the printer PRT1 according to a printing protocol. The printer driver specifies a receiver IP address 'IP1' and a receiver port number '59100' for identifying a receiver software program installed in the printer PRT1, in the communication data DT0.

In the illustrated example of FIG. 1, the communication data DT0 accordingly includes the specified receiver IP address 'IP1' and the specified receiver port number '59100' in its header and a QT value '30 copies' as the print copy number information representing the total number of required copies in its print job data.

The distributed printing system of this embodiment adopts a non-procedural protocol for a printing protocol. A port number '9100' is generally allocated in the non-procedural protocol. The distributed printing system of this embodiment uses the receiver port number '59100', in place of the general port number '9100', in transmission of a print job for copies-dividing distributed printing from the client CL to the printer PRT1 having the distributed printing control functions.

The custom network board CNB of the printer PRT1 receives the communication data DT0 and transfers the print job data included in the received communication data DT0 to a software program standing by at the port number '59100'. In this embodiment, a distributed printing control software program for attaining the distributed printing control functions and performing the copies-dividing distributed printing stands by at the port number '59100'. A functional module of a CPU in the printer PRT1 according to the distributed printing control software program stores the received print job data into a memory (not shown), retrieves printers satisfying preset conditions, for example, 'online' and 'identical model with the printer PRT1', among the multiple printers on the local area network LAN1 and specifies distribution destination printers based on the retrieval.

For example, the printers PRT2 and PRT3 and the self printer PRT1 are specified as the distribution destination printers. The functional module changes the QT value '30 copies' included in the print job data to a new QT value '10 copies' for distributed printing of the total '30 copies' by the three printers PRT1 through PRT3. The functional module changes the receiver port number from '59100' to '9100' and sends communication data DT1 through DT3 to the printers PRT1 through PRT3.

The standard network board attached to the printer PRT2 receives the communication data DT2 and transfers print job data included in the received communication data DT2 to a software program standing by at the port number '9100'. The port number '9100' is generally allocated in the non-procedural protocol used for the printing protocol as mentioned previously. The print job data is transferred to a print control software program installed in the printer PRT2. The printer PRT2 then performs printing according to the received print job data.

In the same manner, the printer PRT1 having the distributed printing control functions and the printer PRT3 individually perform printing according to the received print job data.

Namely the printers PRT1 through PRT3 respectively print '10 copies'. The distributed printing system accordingly completes distributed printing of the total '30 copies'.

In the copies-multiplying distributed printing process, the user manipulates the client CL to specify a copies-multiplying distributed print driver for the printer PRT1 and give a print command for printing '30 copies' as a base number of required copies by copies-multiplying distributed printing. The printer driver sends a print job including print copy number information as communication data to the printer PRT1 according to the printing protocol. The communication data sent from the client CL includes a receiver port number '59101', instead of the general port number '9100' for standard printing or the port number '59100' for copies-dividing distributed printing. The communication data is otherwise identical with the communication data DT0 sent in the copies-dividing distributed printing process described above.

The custom network board CNB of the printer PRT1 receives the communication data and transfers the print job data included in the received communication data to a software program standing by at the port number '59101'. In this embodiment, a distributed printing control software program for attaining the distributed printing control functions and performing the copies-multiplying distributed printing stands by at the port number '59101'. A functional module of a CPU in the printer PRT1 according to the distributed printing control software program specifies distribution destination printers in the same manner as the copies-dividing distributed printing process described above.

For example, the printers PRT2 and PRT3 and the self printer PRT1 are specified as the distribution destination printers. The functional module changes only the receiver port number from '59101' to '9100' and sends the communication data without any change of the QT value but with the changed receiver port number to the printers PRT1 through PRT3. The printers PRT1 to PRT3 thus individually print the copies specified by the unchanged QT value. This is the primary difference from the copies-dividing distributed printing process.

The printing process in each of the printers PRT1 to PRT3 as the specified distribution destination printers is identical with the printing process in the copies-dividing distributed printing process described above.

The printers PRT1 through PRT3 respectively print '30 copies'. The distributed printing system accordingly completes distributed printing of the total '90 copies'. The copies-multiplying distributed printing process is thus suitable for simultaneously printing a greater number of copies, compared with the copies-dividing distributed printing process. The user selects the copies-dividing distributed printing mode when demanding a large number of copies simultaneously.

A2. Structure of Client

Figure 2:
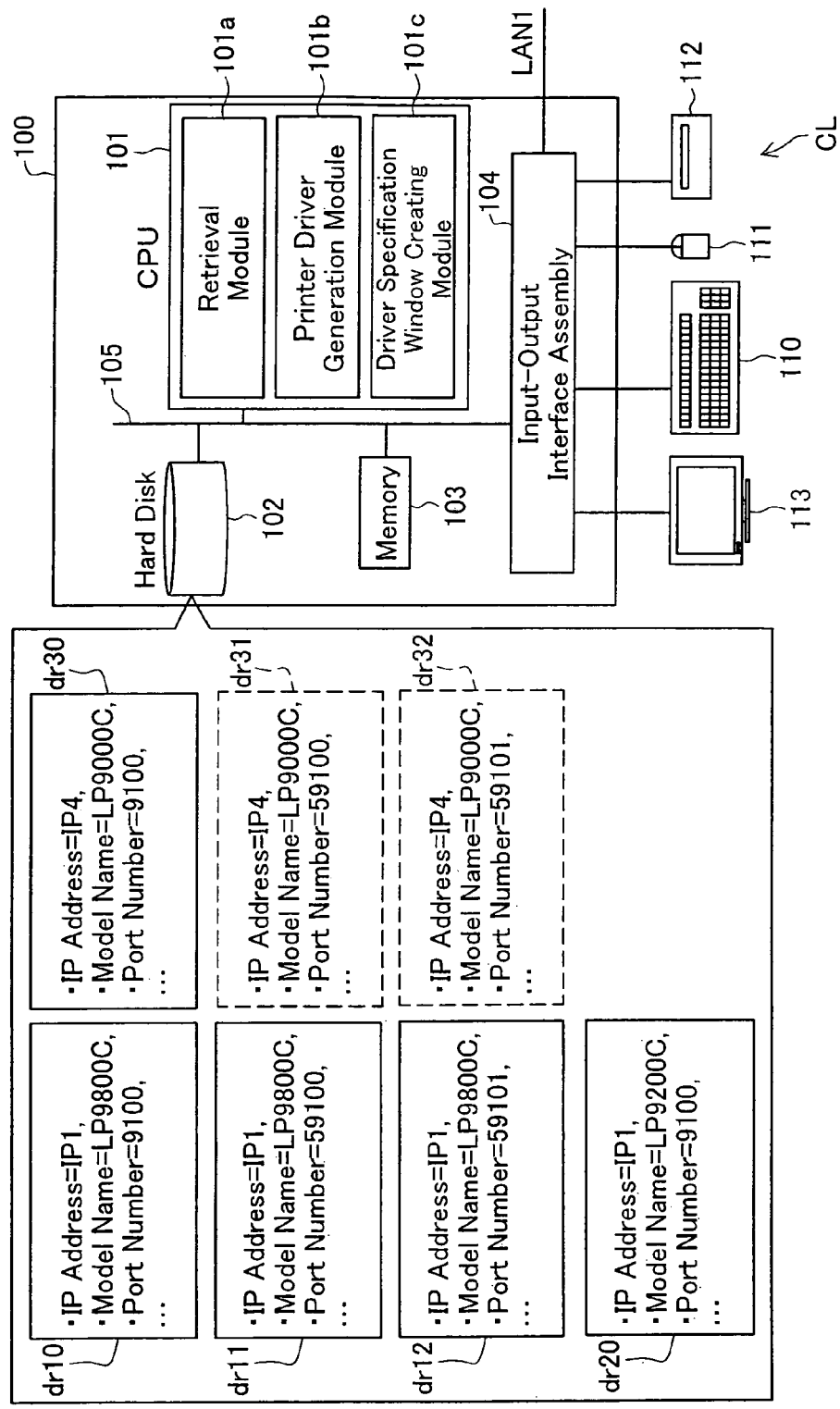
FIG. 2 shows the structure of a client CL included in the distributed printing system of FIG. 1.

FIG. 2 shows the structure of the client CL included in the distributed printing system of FIG. 1.

The client CL has a computer 100, a keyboard 110, a mouse 111, and a CD-ROM driver 112 as data input devices, and a display 113 as a data output device.

The computer 100 mainly includes a CPU 101, a hard disk 102, a memory 103, and an input-output interface assembly 104, which are all connected to an internal bus 105. The input-output interface assembly 104 includes multiple interfaces working to connect the computer 100 with the keyboard 110, the mouse 111, the CD-ROM driver 112, the display 113, and the local area network LAN1.

The client CL executes an application program under a preset operating system. Various drivers are incorporated in the operating system to control the keyboard 110, the mouse 111, the CD-ROM drive 112, and the display 113.

When the application program is activated and is loaded into the memory 103, the CPU 101 executes the application program to function as a retrieval module 101a, a printer driver generation module 101b, and a diver specification window creating module 101c.

Printer drivers dr10 through dr12, dr20, and dr30 corresponding to the user's demanded printers are stored in advance in the hard disk 102. Each of these printer drivers includes a driver main body as the program and properties as an appendix of the driver main body. The properties represent diverse setting values including an IP address of a printer as a receiver of communication data, a model name of the printer as the receiver of communication data, and a port number specified for transmission of communication data. For the convenience of explanation, only setting values of 'IP address', 'model name', and 'port number' among the diverse setting values are shown in FIG. 2.

Other printer drivers dr31 and dr32 shown by the broken lines in FIG. 2 will be described later.

Among the printer drivers dr10 through dr12, dr20, and dr30, the printer drivers dr10, dr20, and dr30 are standard print drivers, the printer driver dr11 is a copies-dividing distributed print driver, and the printer driver dr12 is a copies-multiplying distributed print driver.

When the model names of the user's desired printers are 'LP9800C', 'LP9000C' and 'LP9200C', the user installs printer drivers corresponding to these printer models from a CD-ROM inserted in the CD-ROM drive 112. The port numbers initially set as the property of the respective installed printer drivers are the general port number '9100' for standard printing. The user manually sets IP addresses of the desired printers as the property of the installed printer drivers. This completes generation of standard print drivers for the respective printer models.

When the user selects the printers PRT1 and PRT4 for the actual use, the printer drivers dr10 and dr30 are generated and are stored in the hard disk 102 according to the above procedure.

The printer driver dr20 has setting of an IP address 'IP1' that is identical with the IP address of the printer PRT1. A printer shuffle operation may cause this IP address 'IP1' to be allocated to a printer of a different model (hereafter referred to as 'different model printer'), in place of the printer PRT1. By taking into account this possibility, a standard print driver with the identical IP address is provided for this different model printer.

The printer drivers dr10, dr20, and dr30 have the general port number '9100' set as the property. Communication data sent by any of these printer drivers dr10, dr20, and dr30 includes specification of the receiver port number '9100'. Each of the printers receiving this communication data accordingly performs the standard printing.

The copies-dividing distributed print driver dr11 and the copies-multiplying distributed print driver dr12 are derived from the standard print driver dr10 according to a printer driver generation process described below. The copies-dividing distributed print driver dr11 and the copies-multiplying distributed print driver dr12 are generated to have the common driver main body to that of the standard print driver dr10 but different properties from those of the standard print driver dr10 and are stored in the hard disk 102.

The printer driver dr11 has the port number '59100' set as the property. Communication data sent by this printer driver dr11 includes specification of the receiver port number '59100'. The printer receiving this communication data accordingly performs the copies-dividing distributed printing. The printer driver dr12 has the port number '59101' set as the property. Communication data sent by this printer driver dr12 includes specification of the receiver port number '59101'. The printer receiving this communication data accordingly performs the copies-multiplying distributed printing.

A3. Printer Driver Generation Process

The printer driver generation process that is characteristic of the present invention is described in detail with reference to FIGS. 3 through 5.

For the use of the printer PRT4 as a new distribution source printer in place of the printer PRT1, a copies-dividing distributed print driver and a copies-multiplying distributed print driver for the printer PRT4 are to be stored in advance in the hard disk 102 of the client CL. When the printer PRT4 is used for the first time as a distribution source printer, however, the user may not be informed of previous storage of these printer drivers in the hard disk 102. In such cases, the user manipulates the client CL to activate an application program for generation of such printer drivers.

According to the activated application program, the retrieval module 101a (see FIG. 2) executes a derivation no-generating driver retrieval process as preparation. The derivation no-generating driver retrieval process retrieves any standard print driver having no storage of derived copies-dividing distributed print driver and copies-multiplying distributed print driver in the hard disk drive 102, among all the standard print drivers stored in the hard disk 102.

Figure 3:
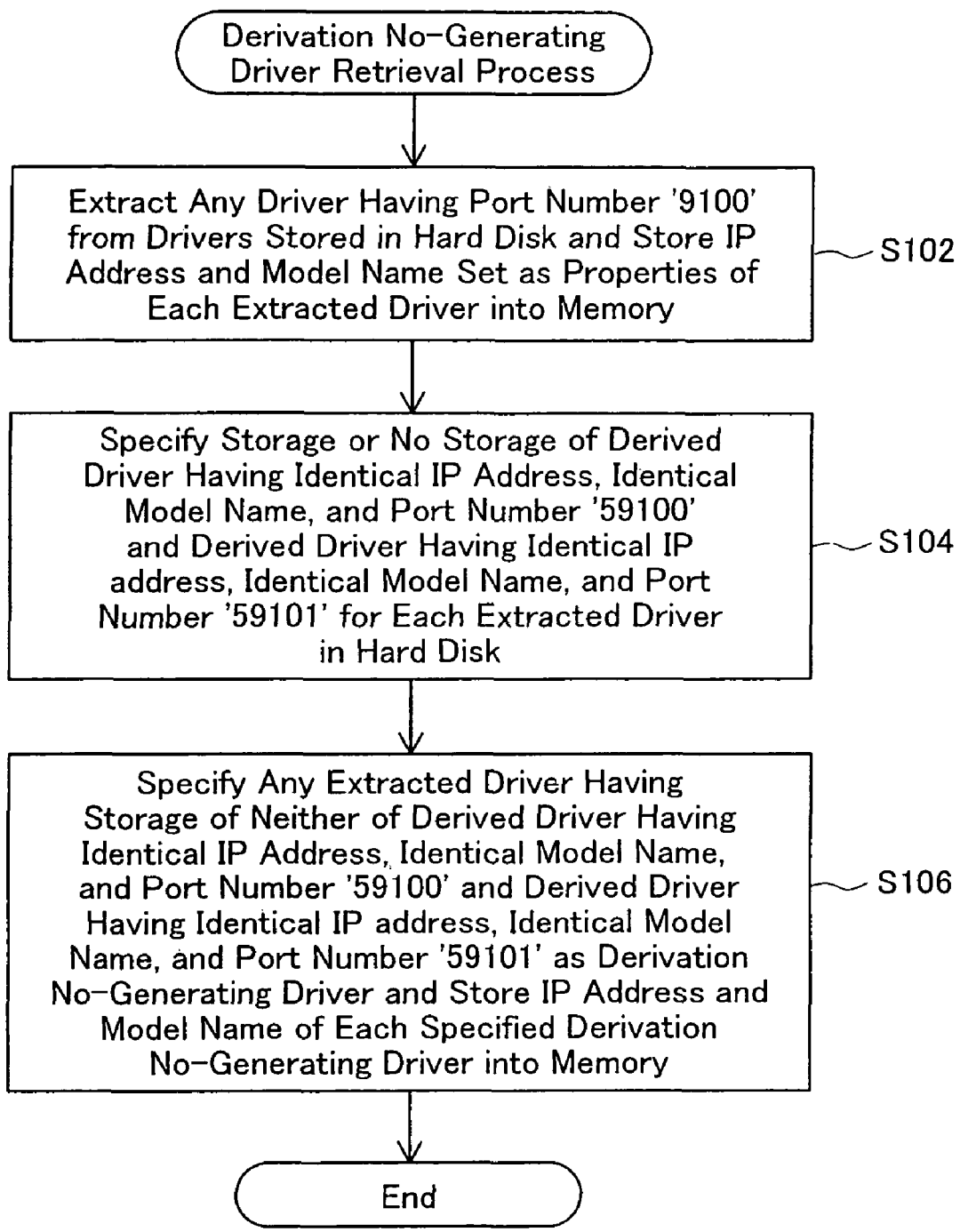
FIG. 3 is a flowchart showing a derivation no-generating driver retrieval process executed by a retrieval module included in the client CL.

FIG. 3 is a flowchart showing a typical flow of the derivation no-generating driver retrieval process executed by the retrieval module 101a.

In the derivation no-generating driver retrieval process of FIG. 3, the retrieval module 101a first extracts any driver having the setting of the port number '9100' from drivers stored in the hard disk 102 and stores the IP address and the model name set as identification information of each extracted driver into the memory 103 (step S102).

This step extracts any standard print driver from multiple printer drivers stored in the hard disk 102. In the illustrated example of FIG. 2, the printer drivers dr10, dr20, and dr30 are the standard print drivers having the setting of the port number '9100'. The retrieval module 101a extracts these printer drivers dr10, dr20, and dr30 and stores their IP addresses and model names 'IP1, LP9800C', 'IP1, LP9200C', and 'IP4, LP9000C' set as properties of these extracted drivers dr10, dr20, and dr30 into the memory 103 at step S102.

The retrieval module 101a then reads the IP address and the model name of each extracted driver from the memory 103 and specifies storage or no storage of following two drivers derived from each extracted driver in the hard disk 102, based on its IP address and model name (step S104):

(1) derived driver having the identical IP address, the identical model name, and the setting of the port number '59100'; and (2) derived driver having the identical IP address, the identical model name, and the setting of the port number '59101'.

This step determines whether a copies-dividing distributed print driver and a copies-multiplying distributed print driver derived from each extracted standard print driver are stored in the hard disk 102.

The retrieval module 101*a* subsequently specifies any extracted driver having storage of neither of the two derived drivers (1) and (2) in the hard disk 102 as a derivation no-generating driver and stores the IP address and the model name of the driver as identification information of each specified derivation no-generating driver into the memory 103 (step S106).

None of the standard print driver having storage of only the derived driver (1) in the hard disk 102, the standard print driver having storage of only the derived driver (2) in the hard disk 102, and the standard print driver having storage of both the derived drivers (1) and (2) in the hard disk 102 is specified as the derivation no-generating driver.

In the illustrated example of FIG. 2, the drivers dr11 and dr12 are stored in the hard disk 102 respectively as the derived driver having the identical IP address, the identical model name, and the setting of the port number '59100' and as the derived driver having the identical IP address, the identical model name, and the setting of the port number '59101' for the driver dr10. The storage of the hard disk 102, however, has neither of these two derived drivers for the drivers dr20 and dr30.

The retrieval module 101*a* accordingly specifies the drivers dr20 and dr30 as derivation no-generating drivers and stores their IP addresses and model names 'IP1, LP9200C' and 'IP4, LP9000C' into the memory 103 at step S106.

The derivation no-generating driver retrieval process specifies any standard print driver having storage of neither of the derived copies-dividing distributed print driver and the derived copies-multiplying distributed print driver in the hard disk 102.

After specification of the derivation no-generating drivers, the driver specification window creating module 101*c* (see FIG. 2) reads the IP addresses and the model names of the respective specified derivation no-generating drivers from the memory 103, creates a driver specification window based on the IP addresses and the model names, and displays the created driver specification window on the display 113. The driver specification window enables the user to select a desired standard print driver for generation of its derivations, that is, a copies-dividing distributed print driver and a copies-multiplying distributed print driver.

Figure 4:
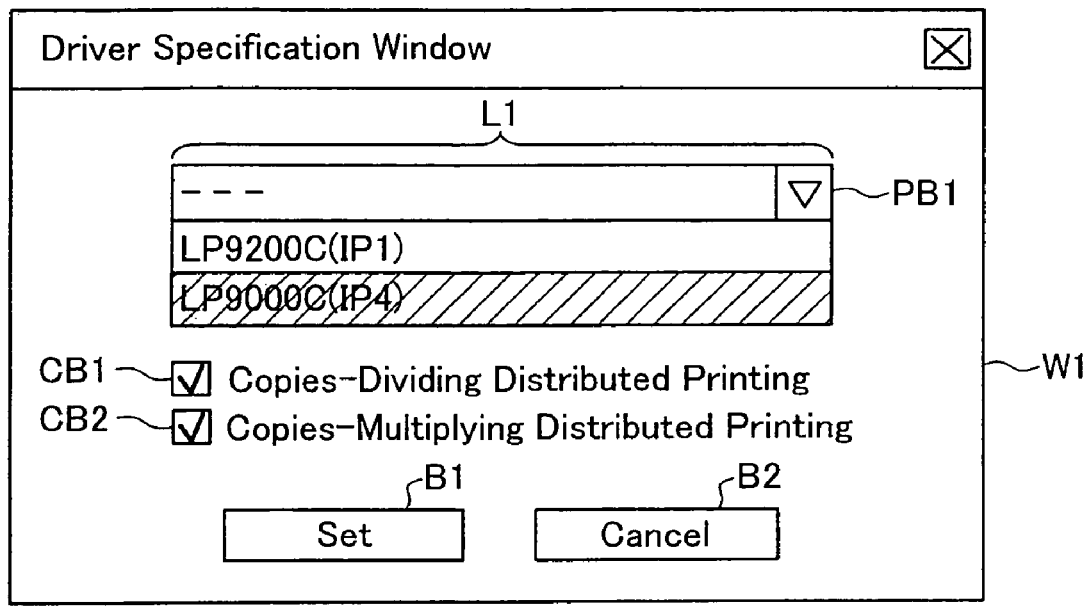
FIG. 4 shows a driver specification window created by a driver specification window creating module included in the client CL.

FIG. 4 shows one driver specification window W1 created by the driver specification window creating module 101*c*.

The driver specification window W1 shown in FIG. 4 has a list display field L1 with a pulldown button PB1, a checkbox CB1 ticked to generate a copies-dividing distributed print driver, a checkbox CB2 ticked to generate a copies-multiplying distributed print driver, a Set button B1, and a Cancel button B2.

In response to the user's click of the pulldown button BP1 with the mouse 111 (see FIG. 2), a list of the specified derivation no-generating drivers is shown in the list display field L1. When the drivers dr20 and dr30 are specified as the derivation no-generating drivers, for example, the list display field L1 shows their model names and IP addresses set as the identification information of the drivers dr20 and dr30 as shown in FIG. 4. The user is thus informed of no storage of the copies-dividing distributed print driver and the copies-multiplying distributed print driver for the printer PRT4 in the hard disk 102.

In the illustrated example of FIG. 4, the user operates the mouse 111 to select the driver dr30 (LP9000C (IP4)), which is the standard print driver for the printer PRT4, in the list display field L1, to tick the checkboxes CB1 and CB2, and to press the Set button B1. In response to the user's click of the Set button B1, the driver specification window generation module 101*c* stores the IP address (IP4) and the model name (LP9000C) set as the properties of the selected driver dr30 and the specified driver types to be generated (copies-dividing distributed print driver and copies-multiplying distributed print driver) into the memory 103.

Upon storage of the IP address and the model name of the user's selected driver and the user's specified driver types into the memory 103, the printer driver generation module 101*b* (see FIG. 2) starts a printer driver generation process.

Figure 5:
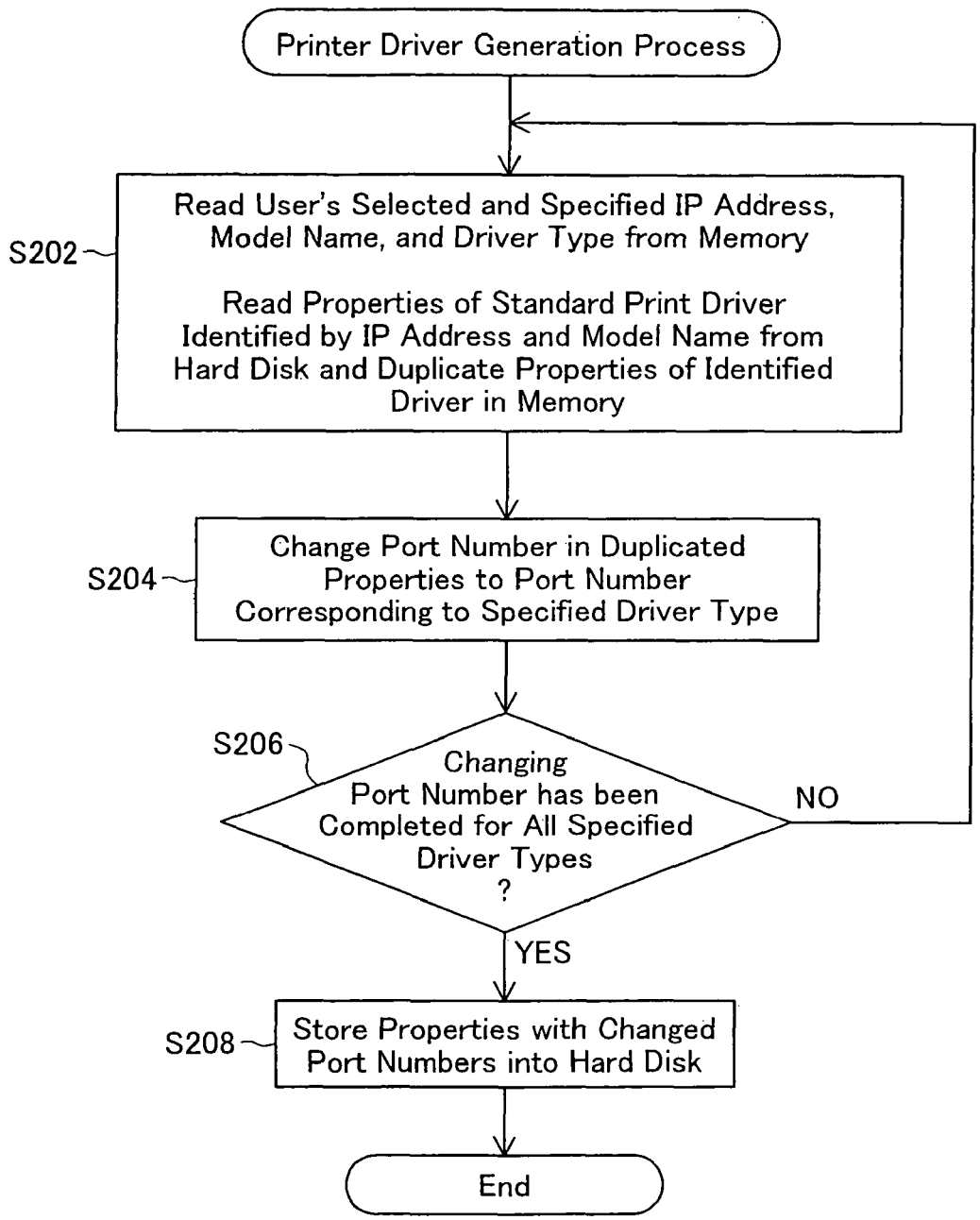
FIG. 5 is a flowchart showing a printer driver generation process executed by a printer driver generation module included in the client CL.

FIG. 5 is a flowchart showing a typical flow of the printer driver generation process executed by the printer driver generation module 101*b*.

In the printer driver generation process of FIG. 5, the printer driver generation module 101*b* (see FIG. 2) first reads an IP address, a model name, and a driver type selected and specified by the user from the memory 103, reads the properties of the standard print driver identified by the IP address and the model name from the hard disk 102, and duplicates the properties of the identified standard print driver in the memory 103 (step S202).

When 'IP4', 'LP9000C', and 'copies-dividing distributed print driver' and 'copies-multiplying distributed print driver' are stored as the user's selection and specification in the memory 103, for example, the printer driver generation module 101*b* reads the properties of the driver dr30 identified by 'IP4' and 'LP9000C' from the hard disk 102 and duplicates the properties of the driver dr30 in the memory 103 at step S202.

The printer driver generation module 101*b* changes the port number in the duplicated properties from '9100' to a port number corresponding to the specified driver type (step S204). In the illustrated example of FIG. 4, both 'copies-dividing distributed print driver' and 'copies-multiplying distributed print driver' are specified as the driver types to be generated. In the first cycle, the printer driver generation module 101*b* changes the port number '9100' in the duplicated properties to the port number '59100' corresponding to the copies-dividing distributed print driver.

The printer driver generation module 101*b* then determines whether changing the port number of the duplicated properties has been completed for all the specified driver types (step S206). When there is any other specified driver type without a change of the port number in the duplicated properties at step S206, the processing of steps S202 and S204 is repeated. When both 'copies-dividing distributed print driver' and 'copies-multiplying distributed print driver' are specified as the driver types to be generated, the printer driver generation module 101*b* duplicates the properties of the selected driver dr30 again in the memory 103 and changes the port number '9100' in the duplicated properties to the port number '59101' corresponding to the copies-multiplying distributed print driver in the next cycle.

When there is no other specified driver type without a change of the port number in the duplicated properties at step S206, the printer driver generation module 101*b* stores the properties with the changed port number into the hard disk 102 (step S208).

When the duplicated properties in the memory 103 have the changed port number '59100' and the changed port number '59101', the properties with the changed port number '59100' and the properties with the changed port number '59101' are stored into the hard disk 102. The driver software program refers to these properties stored in the hard disk 102 and generates two new printer drivers.

The printer driver generation process accordingly generates and stores the driver dr31 as the copies-dividing distributed print driver for the printer PRT4 and the driver dr32 as the copies-multiplying distributed print driver for the printer PRT4 in the hard disk 102 as shown by the broken lines in FIG. 2. The user specifies one of these drivers dr31 and dr32 provided for the printer PRT4. The printer PRT4 performs the copies-dividing distributed printing or the copies-multiplying distributed printing in response to the user's specification.

A4. Effects of Embodiment

As described above, the retrieval module 101a in the client CL retrieves and specifies any standard print driver having no corresponding copies-dividing distributed print driver and no corresponding copies-multiplying distributed print driver, among multiple printer drivers stored in the hard disk 102. The driver specification window creating module 101c creates and opens the driver specification window W1 on the display 113 to show a list of the standard print drivers specified by the retrieval module 101a. This arrangement enables the user to readily check a selected printer as a desired distribution source printer for the presence of the copies-dividing distributed print driver and the copies-multiplying distributed print driver.

In response to the user's selection and specification of a desired standard print driver and at least one desired driver type, the printer driver generation module 101b executes the printer driver generation process to generate at least one of the specified copies-dividing distributed print driver and the specified copies-multiplying distributed print driver corresponding to the selected standard print driver. This simple method readily provides the user's desired printer drivers in the client CL.

B. Modifications

The embodiment discussed above is to be considered in all aspects as illustrative and not restrictive. There may be many modifications, changes, and alterations without departing from the scope or spirit of the main characteristics of the present invention. Some examples of possible modification are given below.

B1. Modified Example 1

In the configuration of the above embodiment, the distribution source printer refers to a port number specified in each print job sent from the client and identifies whether the received print job is to be distributed (print job for distributed printing) or to be printed without distribution (print job for standard printing). The identification of the print job is, however, not restrictively based on the port number but may be based on the printing protocol used for transmission of the print job.

For example, a print job sent according to the non-procedural protocol is identified as a print job for standard printing, whereas a print job sent according to the LPR (line printer daemon protocol) is identified as a print job for distributed printing. A printer driver with setting of 'non-procedural protocol' to the 'specified printing protocol' as one of the properties and a printer driver with the setting of 'LPR' to the 'specified printing protocol' are provided in the client respectively as the printer driver to be specified for distributed printing and as the printer driver to be specified for standard printing.

In this modified example, the derivation no-generating driver retrieved and specified among extracted standard print drivers by the derivation no-generating driver retrieval process is any standard print driver having no storage of a corresponding distributed print driver with the setting of 'LPR' to the 'specified printing protocol' in the hard disk. The printer driver generation process of this modified example changes the 'specified printing protocol' in the duplicated properties of the specified standard print driver from the 'non-procedural protocol' to the 'LPR'.

B2. Modified Example 2

The printer driver generation process of the above embodiment changes the port number in the duplicated properties of a specified standard print driver to generate corresponding copies-dividing distributed print driver and corresponding copies-multiplying distributed print driver. One modified flow of the printer driver generation process may change inquiry setting information as well as the port number in the duplicated properties of the specified standard print driver. The inquiry setting information specifies requirement or non-requirement to make inquiries about the operating status of the printer at regular intervals.

In the illustrated example of FIG. 2, the inquiry setting information is enabled (to make inquiries) in the standard print drivers dr10, dr20, and dr30. The modified flow of the printer driver generation process disables the inquiry setting information (to make no inquiries) and changes the port number in the duplicated properties of the standard print driver dr10 to generate the corresponding copies-dividing distributed print driver dr11 and the corresponding copies-multiplying distributed print driver dr12.

The printer driver dr10 has the 'enabled' inquiry setting information and thus makes inquiries about the operating status of the printer PRT1 at regular intervals. When the printer PRT1 is in an unprintable status due to paper jam, out-of-toner, or any other trouble, the printer driver dr10 is informed of the unprintable status of the printer PRT1 as a reply to the regular inquiry. In this case, the printer driver dr10 does not immediately send a print job for standard printing to the printer PRT1 but stores the print job in the memory. After confirmation that the printer PRT1 is recovered to the printable status, the printer driver dr10 sends the stored print job for standard printing to the printer PRT1. This arrangement effectively prevents a print job for standard printing from being sent to the printer PRT1 in the unprintable status.

Even in the unprintable status of the printer PRT1 due to, for example, paper jam or out-of-toner, when there is any other distribution destination printer in the printable status, the custom network board CNB of the printer PRT1 distributes a print job for distributed printing to the distribution destination printer in the printable status. If the inquiry setting information is enabled in the printer drivers dr11 and dr12, however, a print job for distributed printing is not sent to the printer PRT1 that is in the unprintable status but has the capability of distributing the received print job.

The inquiry setting information is thus 'disabled' in the printer drivers for distributed printing, that is, the copies-dividing distributed print driver and the copies-multiplying distributed print driver.

B3. Modified Example 3

The derivation no-generating driver retrieval process of the embodiment extracts all the standard print drivers having the port number '9100' and then determines whether each extracted standard print driver has storage of corresponding copies-dividing distributed print driver and copies-multiplying distributed print driver in the hard disk. This flow is, however, not essential.

One modified flow of the derivation no-generating driver retrieval process sequentially extracts one standard print driver having the port number '9100' and determines whether the extracted standard print driver has storage of corresponding copies-dividing distributed print driver and copies-multiplying distributed print driver in the hard disk.

B4. Modified Example 4

In the configuration of the above embodiment, the client specifies a driver having the port number '9100' as one of the properties for standard printing and a driver having either the port number '59100' or the port number '59101' for distributed printing (copies-dividing distributed printing or copies-multiplying distributed printing). Such setting of the port numbers is, however, not essential.

In one modified example, the distribution source printer may identify each received print job with the port number '9100' as a print job for distributed printing and each received print job with the port number '59100' as a print job for standard printing. In this case, the client specifies a driver having either the port number '59100' or the port number '59101' for standard printing and a driver having the port number '9100' for distributed printing.

Finally the present application claims the priority based on Japanese Patent Application No. 2005-092934 filed on Mar. 28, 2005, which is herein incorporated by reference.

What is claimed is:

1. A client computer that utilizes a printer driver for a distribution source printer to send a print job to the distribution source printer, wherein the distribution source printer distributes each print job sent with setting of a preset second port number to multiple distribution destination printers, the client computer comprising:

a storage unit that stores a first printer driver with property information including specification of a port number, which is specified and used for transmission of each print job and is currently set to a preset first port number, as one printer driver for the distribution source printer; and a printer driver generation module that, in response to an externally given instruction, duplicates the property information of the first printer driver read from the storage unit and changes the port number included in the duplicated property information of the first printer driver to the preset second port number, which is different from the preset first port number, and simultaneously disables inquiry setting information, which is included in the duplicated property information and is enabled and disabled to allow the client computer to make an inquiry and to make no inquiry about an operating status of the distribution source printer, to generate a second printer driver as another printer driver for the distribution source printer.

2. A client computer that utilizes a printer driver for a distribution source printer to send a print job to the distribution source printer, wherein the distribution source printer distributes each print job sent according to a preset second printing protocol to multiple distribution destination printers, the client computer comprising:

a storage unit that stores a first printer driver with property information including specification of a printing protocol, which is specified and used for transmission of each print job and is currently set to a preset first printing protocol, as one printer driver for the distribution source printer; and a printer driver generation module that, in response to an externally given instruction, duplicates the property information of the first printer driver read from the storage unit and changes the printing protocol specified in the duplicated property information of the first printer driver to the preset second printing protocol, which is different from the preset first printing protocol, and simultaneously disables inquiry setting information, which is included in the duplicated property information and is enabled and disabled to allow the client computer to make an inquiry and to make no inquiry about an operating status of the distribution source printer, to generate a second printer driver as another printer driver for the distribution source printer.

3. A client computer that utilizes a printer driver for one of multiple distribution source printers to send a print job to the distribution source printer, wherein each of the multiple distribution source printers distributes each print job sent with setting of a preset second port number to multiple distribution destination printers, the client computer comprising:

a storage unit that stores multiple first printer drivers as respective printer drivers for the multiple distribution source printers, wherein each first printer driver for one of the multiple distribution source printers has property information including identification information for identifying the distribution source printer and specification of a port number, which is specified and used for transmission of each print job and is currently set to a preset first port number;

a printer driver generation module that, in response to an externally given instruction, specifies a first printer driver for a selected distribution source printer among the multiple first printer drivers for the multiple distribution source printers, duplicates the property information of the specified first printer driver read from the storage unit, changes the port number included in the duplicated property information of the specified first printer driver to the preset second port number, which is different from the preset first port number, and simultaneously disables inquiry setting information, which is included in the duplicated property information and is enabled and disabled to allow the client computer to make an inquiry and to make no inquiry about an operating status of the selected distribution source printer, to generate a second printer driver as another printer driver for the selected distribution source printer, and stores the generated second printer driver into the storage unit; and a retrieval module that retrieves any first printer driver without a corresponding second printer driver as a derivation no-generating driver, among plural printer drivers stored in the storage unit, wherein the retrieval module refers to the port number included in the property information of each of the plural printer drivers stored in the storage unit to extract the multiple first printer drivers with specification of the preset first port number, determines whether the storage unit stores a second printer driver that corresponds to each of the extracted multiple first printer drivers and has property information including an identical piece of the identification information with the extracted first printer driver and the port number set to the preset second port number, and specifies the first printer driver with no storage of the corresponding second printer driver as the derivation no-generating driver.

4. The client computer in accordance with claim 3, comprising a user interface to display a list of the derivation no-generating drivers specified by the retrieval module.

5. A printer driver generation method that is adapted in a client computer to generate a second printer driver for a distribution source printer from a first printer driver for the distribution source printer, the client computer utilizing a printer driver for the distribution source printer to send a print job to the distribution source printer and having a storage unit that stores each printer driver with property information that includes specification of a port number specified and used for transmission of each print job, the distribution source printer distributing each print job sent with setting of a preset second port number to multiple distribution destination printers, the printer driver generation method comprising:
(a) duplicating the property information of the first printer driver, which is read from the storage unit and includes specification of the port number currently set to a preset first port number; and
(b) changing the port number included in the duplicated property information of the first printer driver to the preset second port number, which is different from the preset first port number, and simultaneously disabling inquiry setting information, which is included in the duplicated property information and is enabled and disabled to allow the client computer to make an inquiry and to make no inquiry about an operating status of the distribution source printer, to generate the second printer driver for the distribution source printer.

6. A printer driver retrieval method that is adapted in a client computer to retrieve a specific printer driver among multiple printer drivers stored in a storage unit of the client computer, the client computer utilizing a printer driver for one of multiple distribution source printers to send a print job to the distribution source printer, each of the multiple distribution source printers distributing each print job sent with setting of a preset second port number to multiple distribution destination printers, the printer driver retrieval method comprising:
(a) storing multiple first printer drivers into the storage unit as respective printer drivers for the multiple distribution source printers, wherein each first printer driver for one of the multiple distribution source printers has property information including identification information for identifying the distribution source printer and specification of a port number, which is specified and used for transmission of each print job and is currently set to a preset first port number;
(b) specifying a first printer driver for a selected distribution source printer among the multiple first printer drivers for the multiple distribution source printers, duplicating the property information of the specified first printer driver read from the storage unit, changing the port number included in the duplicated property information of the specified first printer driver to the preset second port number, which is different from the preset first port number, and simultaneously disabling inquiry setting information, which is included in the duplicated property information and is enabled and disabled to allow the client computer to make an inquiry and to make no inquiry about an operating status of the selected distribution source printer, to generate a second printer driver as another printer driver for the selected distribution source printer, and storing the generated second printer driver into the storage unit;
(c) referring to the port number included in the property information of each of the plural printer drivers stored in the storage unit to extract the multiple first printer drivers with specification of the preset first port number;
(d) determining whether the storage unit stores a second printer driver that corresponds to each of the extracted multiple first printer drivers and has property information including an identical piece of the identification information with the extracted first printer driver and the port number set to the preset second port number; and
(e) specifying the first printer driver with no storage of the corresponding second printer driver as the specific printer driver.

7. A non-transitory computer-readable medium storing a computer program product which, when executed by a computer, causes the computer to execute generating a second printer driver for a distribution source printer from a first printer driver for the distribution source printer, the computer utilizing a printer driver for the distribution source printer to send a print job to the distribution source printer and having a storage unit that stores each printer driver with property information that includes specification of a port number specified and used for transmission of each print job, the distribution source printer distributing each print job sent with setting of a preset second port number to multiple distribution destination printers, the computer program product comprising:
a first program code for duplicating property information of the first printer driver, which is read from the storage unit and includes specification of the port number currently set to a preset first port number; and
a second program code for changing the port number included in the duplicated property information of the first printer driver to the preset second port number, which is different from the preset first port number, and simultaneously disabling inquiry setting information, which is included in the duplicated property information and is enabled and disabled to allow the client computer to make an inquiry and to make no inquiry about an operating status of the distribution source printer, to generate the second printer driver for the distribution source printer.

8. A non-transitory computer-readable medium storing a computer program product which, when executed by a computer, causes the computer to execute retrieving a specific printer driver among multiple printer drivers stored in a storage unit of the computer, the computer utilizing a printer driver for one of multiple distribution source printers to send a print job to the distribution source printer, each of the multiple distribution source printers distributing each print job sent with setting of a preset second port number to multiple distribution destination printers, the computer program product comprising:
a first program code for storing multiple first printer drivers into the storage unit as respective printer drivers for the multiple distribution source printers, wherein each first printer driver for one of the multiple distribution source printers has property information including identification information for identifying the distribution source printer and specification of a port number, which is specified and used for transmission of each print job and is currently set to a preset first port number;

a second program code for specifying a first printer driver for a selected distribution source printer among the multiple first printer drivers for the multiple distribution source printers, duplicating the property information of the specified first printer driver read from the storage unit, changing the port number included in the duplicated property information of the specified first printer driver to the preset second port number, which is different from the preset first port number, and simultaneously disabling inquiry setting information, which is included in the duplicated property information and is enabled and disabled to allow the client computer to make an inquiry and to make no inquiry about an operating status of the selected distribution source printer, to generate a second printer driver as another printer driver for the selected distribution source printer, and storing the generated second printer driver into the storage unit;

a third program code for referring to the port number included in the property information of each of the plural printer drivers stored in the storage unit to extract the multiple first printer drivers with specification of the preset first port number;

a fourth program code for determining whether the storage unit stores a second printer driver that corresponds to each of the extracted multiple first printer drivers and has property information including an identical piece of the identification information with the extracted first printer driver and the port number set to the preset second port number; and a fifth program code for specifying the first printer driver with no storage of the corresponding second printer driver as the specific printer driver.

9. A client computer that utilizes a printer driver for a distribution source printer to send a print job to the distribution source printer, wherein the distribution source printer distributes each print job sent with setting of a preset second port number to multiple distribution destination printers, the client computer comprising:

a storage unit that stores a first printer driver with property information including specification of a port number, which is specified and used for transmission of each print job and is currently set to a preset first port number used for not distributing each print job, as one printer driver for the distribution source printer; and a printer driver generator configured to, in response to an externally given instruction, duplicate the property information of the first printer driver read from the storage unit, change the port number included in the duplicated property information of the first printer driver to any one of a plurality of preset second port numbers, which are different from each other and are different from the preset first port number and are corresponding to a plurality of distribution aspects, and simultaneously disable inquiry setting information, which is included in the duplicated property information and is enabled and disabled to allow the client computer to make an inquiry and to make no inquiry about an operating status of the distribution source printer, to generate a plurality of second printer drivers as another printer drivers for the distribution source printer used for distributing each print job.

* * * * *